US006485664B1

(12) United States Patent
Wreschinsky

(10) Patent No.: US 6,485,664 B1
(45) Date of Patent: Nov. 26, 2002

(54) EXTRUSION CRYSTALLIZATION OF AN OLEFIN POLYMER

(75) Inventor: Michael Wreschinsky, Montgomery, IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/481,453

(22) Filed: Jan. 11, 2000

Related U.S. Application Data

(60) Provisional application No. 60/116,474, filed on Jan. 20, 1999.

(51) Int. Cl.[7] .............................................. B29C 47/00
(52) U.S. Cl. .............................. 264/211.21; 264/176.1; 264/211.23
(58) Field of Search ...................... 264/211.21, 211.23, 264/209.7, 211.24, 349, 140, 143, 176.1

(56) References Cited

U.S. PATENT DOCUMENTS

| | | | |
|---|---|---|---|
| 3,714,320 A | * | 1/1973 | Shaw |
| 4,449,904 A | * | 5/1984 | Austen et al. |
| 4,783,301 A | * | 11/1988 | Hong |
| 5,026,512 A | * | 6/1991 | Chang |
| 5,395,055 A | * | 3/1995 | Shutov et al. |
| 5,397,065 A | * | 3/1995 | Shutov et al. |
| 5,415,354 A | * | 5/1995 | Shutov et al. |
| 5,594,080 A | | 1/1997 | Waymouth et al. .......... 526/126 |
| 5,704,555 A | * | 1/1998 | Arastoopour |
| 5,743,471 A | | 4/1998 | Ivanov |
| 5,747,621 A | | 5/1998 | Resconi et al. ............. 526/351 |
| 5,969,070 A | | 10/1999 | Waymouth et al. ......... 526/351 |
| 6,228,302 B1 | * | 5/2001 | Al Ghatta |

FOREIGN PATENT DOCUMENTS

| | | |
|---|---|---|
| CA | 2105914 | 3/1994 |
| EP | 627295 | 12/1994 |
| JP | 51017273 | 2/1976 |
| JP | 08067758 | 7/1996 |
| JP | 09011318 | 1/1997 |

OTHER PUBLICATIONS

Dietrich et al., Control of Stereoerror Formation with High Activity Dual–Side Zirconocene Catalysts: Journal of the American Chemical Soc. vol. 121, pp. 4348–4355, Apr. 27, 1999.

Chemical Abastracts, vol. 18, No. 13, Mar. 30, 1998, Abstract No. 154970.

Han–Xiong Huang, "Self–reinforcement of Polypropylene by Flow Induced Crystallization During Continuous Extrusion" Journal of Applied Polymer Science, vol. 67, Dec. 12, 1998, pp. 2111–2118.

Chemical Abastracts, vol. 94, No. 4, Jan. 26, 1981, Abstract No. 16692.

Collier et al., "Flow–induced Cryst. Polym. Sys.," Midl. Macromol. Monogra. vol. 6, 1979,, pp 125–137.

* cited by examiner

Primary Examiner—Mark Eashoo
(74) Attorney, Agent, or Firm—Wallace L. Oliver

(57) ABSTRACT

A method to melt process a thermoplastic, partially-crystalline, olefin polymer in a multi-temperature stage extruder wherein the polymer has a broad melting temperature range comprises setting the temperature profile of the extruder such that a portion of the polymer crystallizes in the extruder and passing the resulting partially-crystallized polymer through an extruder die.

19 Claims, No Drawings

EXTRUSION CRYSTALLIZATION OF AN OLEFIN POLYMER

CROSS-REFERENCE TO RELATED APPLICATIONS

This application claims the benefit of U.S. Provisional Application No. 60/116,474, filed Jan. 20, 1999, which is incorporated by reference herein.

STATEMENT REGARDING FEDERALLY SPONSORED RESEARCH DEVELOPMENT

This invention, in part, was made with Government support under ATP grant 70NANB5H1140 awarded by the National Institute of Standards and Technology. The United States Government may have certain rights in this invention.

BACKGROUND OF THE INVENTION

This invention relates to melt processing of olefin polymers and more particularly relates to melt extrusion and pelletization of elastomeric propylene polymers.

Extrusion of thermoplastic crystalline olefin polymers is well known in the art. Extrusion of these polymers is widely practiced from laboratory-scale test units to full-size commercial equipment. Extruders typically are used to convert polymer powder formed in a polymerization reactor to melted strands that may be chopped into pellets. Extruders also are used to blend polymer with additive materials such as stabilizers, anti-oxidants, and acid scavengers such that additives are well dispersed into the polymer. In a typical extruder apparatus, normally-solid polymer is transported through a barrel by action of a rotating screw. The polymer typically is heated by mechanical action and externally-applied heat through zones in the extruder barrel. Additives may be blended with the polymer in the screw-agitated process, and melted polymer which incorporate such additives is extruded through an orifice or die into strands, fibers, or sheets.

In a conventional extrusion process for a crystalline thermoplastic polymer, such as isotactic polypropylene, the final extruder barrel zone temperature is maintained above the polymer melting point. Cyrstalline isotactic polypropylene has a narrow temperature melting range with rapid crystallization upon cooling. If this material flows through the last extruder zone and die and falls below the polymer crystallization temperature, the isotactic polypropylene would solidify in the barrel and at the extruder orifice. This would result in excessively high torque on the extruder and high barrel pressures and, ultimately, would shut down the extruder. Thus, in a conventional extrusion process for crystalline propylene polymer, the last extruder zone temperature must be high enough to prevent polymer freezing in the barrel.

There is now a class of partially crystalline olefin polymers with a broad melting range, which may exhibit elastomeric properties. In order to incorporate additives and form into pellets, these polymers should be processed in an extruder. If these partially-crystalline polymers are extruded in a conventional manner in which the barrel exit temperature is above the polymer melting temperature, the resulting extruded polymer strand has no rigidity and is very sticky. Such a sticky strand does not easily feed into a pelletizer and may wrap around the cutting blades of a pelletizer. Even when some polymer strands get to the cutting blades, the blades may not cut completely through the strand.

This invention permits melt processing and subsequent formation of polymer pellets of such a polymer with a broad melting range without these problems.

SUMMARY OF THE INVENTION

A method to melt process a thermoplastic, partially-crystalline, olefin polymer in a multi-temperature stage extruder wherein the polymer has a broad melting temperature range comprises setting the temperature profile of the extruder such that a portion of the polymer crystallizes in the extruder and passing the resulting partially-crystallized polymer through an extruder die.

DESCRIPTION OF THE INVENTION

The method of this invention permits melt processing of a thermoplastic, partially-crystalline, olefin polymer which has a broad melting temperature range. Melt processing such a polymer through an extruder using conventional techniques in which polymer exits the extruder in a fully-melted state, produces a polymer strand which has little if any rigidity and is very sticky. As a result the strand is difficult to feed into a pelletizer and would stick to and wrap around the take-up rollers instead of feeding to the cutting blades.

In the method of this invention, such a thermoplastic, partially-crystalline, olefin polymer preferably is melted in an initial stage of an extruder, but the extruder temperature profile is set such that the polymer partially crystallizes at least at the last extruder zone. A partially-crystallized polymer is extruded into a strand which has sufficient rigidity to feed satisfactorily into a pelletizer. An adequate polymer strand is firm, typically translucent, has low stickiness, and is readily pelletized. Such strands do not significantly stick together in a collection container.

A typical thermoplastic, partially-crystalline, olefin polymer useful in this invention has a broad melting temperature range of over 50° C. and up to about 200° C. A broad melting temperature typically indicates the compositions contain a minor amount of crystallizable material within a matrix of amorphous material.

In describing this invention, melting ranges and crystallization temperature are measured using Differential Scanning Calorimetry (DSC). Using DSC to measure melting characteristics of a polymer useful in this invention shows a range of melting in a polymer in which crystalline phase will be present in a melted phase. In contrast to a DSC measurement of an isotactic polypropylene which shows a narrow temperature range of melting, polymers useful in this invention will show a broad melting range of over 50° C. and up to about 200° C. Typical melting ranges are about 100 to 150° C. The melting range typically is measured as the width of the crystalline melting endotherm as observed in the DSC. The melting range is sufficiently broad to permit a minor amount of crystalline phase to be incorporated within a major amount of a flowable non-crystalline matrix phase at a temperature within the melting range. A flowable polymer will pass through an extruder without using significant pressure or torque. Although melted polymer exists throughout the melting range, typically the melting temperature as measured by DSC ($T_m$) is the maximum peak (or inverse peak) of the DSC thermogram heating at 20° C./min. This should correspond to the temperature at which the largest portion of crystalline material melts.

Another temperature measurable by DSC is the crystallization temperature ($T_c$) which is determined by cooling a totally melted polymer and determining the maximum peak (or inverse peak) in the DSC cooling at 10° C./min. As the polymer is cooled, it passes through a supercooled phase before crystallization occurs. Thus the $T_c$ will be lower than the $T_m$. Polymers used in this invention may have a $T_c$ 20 to 100° C. (typically 30 to 90° C.) lower than the $T_m$. Typically, polymers useful in this invention will be sticky if rapidly cooled from a total melt phase because a solid supercooled phase is produced which does not include significant amounts of crystalline phase.

Olefin-based polymers useful in this invention include polymers of ethylene, propylene and $C_4$–$C_8$ olefins having a broad melting range. Partially crystalline olefin polymers having a broad melting range include elastomeric propylene polymers and propylene-ethylene copolymers which may have up to 50 mole % of ethylene.

Propylene polymers useful in this invention should have about 10 to about 30 percent crystallinity which corresponds to m4 values (as measured by $^{13}C$ NMR) of about 25 to 55%. The isotactic pentad (m4) content is the percentage of isotactic stereosequences of five contiguous stereocenters as measured by $^{13}C$ NMR. The m4 of a statistically atactic polypropylene is about 6.25% while that of a highly isotactic polypropylene approaches 100%. Typical polymers useful in this invention have a crystallinity of 15 to 25% at room temperature (20° C.) which corresponds to m4 values of about 25 to 45%. Typical melting temperatures for useful propylene polymers are about 75 to about 155° C., preferably about 100 to about 150° C. Typical crystallization temperatures for useful propylene polymers are about 45 to about 120° C., preferably about 80 to about 110° C.

At the exit zone of an extruder in the process of this invention, crystallized polymer is incorporated into a matrix of flowable non-crystalline phase. Thus, after such polymer passes through the extruder exit zone, the polymer will solidify into a form which possesses sufficient physical integrity to be formed into films, strands, or pellets In a preferable process of this invention, suitable polymer is passed through an extruder device such that the barrel temperature at the beginning of the extruder is sufficiently above the melting temperature, $T_m$, such that a total melt phase is present and in which appropriate polymer additives and stabilizers may be incorporated completely. Thus, the barrel temperature at the beginning of the extruder is set higher than $T_m$ and below a temperature at which the polymer is degraded. A typical beginning temperature zone would be about 5° C. to about 20° C. higher than $T_m$ and preferably about 10° C. to about 20° C. higher than $T_m$. For a typical polymer with a $T_m$ of about 150° C., the first extruder heat zones may be about 160–170° C.

Temperature along the barrel is decreased such that in the last barrel heat zone the temperature is at or below the crystallization temperature, $T_c$, which permits partially crystallized polymer to exit the extruder. Thus, the final temperature zone in the extruder is set lower than $T_c$ but sufficiently high to permit flow of the polymer through the extruder exit or die. A typical final temperature zone would be about 5° C. to about 15° C. lower than $T_c$ and preferably about 5° C. to about 10° C. lower than $T_c$. For a typical polymer useful in this invention with a $T_c$ of about 95–110° C., the final barrel temperature typically is set to about 90–100° C.

The temperature profile for a particular suitable polymer useful in this invention must be set to permit partial crystallization in the final extruder stage while maintaining sufficient polymer flowability. Temperatures for a high melt flow rate (low molecular weight) polymer would be lower than a lower melt flow polymer to achieve partial crystallization in the final stage. Also, suitable polymers filled with inert materials such as talc and calcium carbonate will require a higher temperature to maintain flowability.

Extruders useful in this invention are well known in the art. Useful barrel polymer extruders have a plurality of temperature zones that may be independently set along the length of the extrusion barrel. A typical extruder has about 3 to about 20 or more temperature zones and preferably has about 4 to about 15 zones. Since the polymer is cooling as it passes through the barrel, heat must be transferred from the polymer through the barrel wall. Longer extruders may be preferred to permit more efficient heat transfer from the polymer to the barrel in this process. Although a screw extruder, in which a rotating screw device in the extruder barrel provides the necessary force to transport the polymer through the apparatus, is preferred, a static mixer also may be used, in which polymer is transported by an external pump.

Preferable polymers useful in this invention include propylene polymers which exhibit elastomeric properties such as tending to regain its shape upon extension or exhibiting a positive power of recovery at 100%, 200% and 300% elongation. The preferable polymer useful in this invention is an elastomeric propylene based polymer described in U.S. Pat. No. 5,594,080, incorporated by reference herein. The elastomer polymer formed according to this disclosure, has regions of isotactic and atactic structures which produces a polymer with a broad melting range. Such polymers have a high molecular weight and a narrow molecular weight distribution and are homogeneous in composition with typical melting points of 50 to 145° C.

Typical polymers useful in this invention are propylene polymers that may be homopolymers or copolymers of propylene with minor amounts of ethylene or other alphaolefin. Introduction of comonomers typically decreases the processing temperatures. These polymers may be extruded according to this invention, but at lower barrel temperatures appropriate to the melting and crystallization temperatures of the copolymer.

Also, these polymers may be combined with inert fillers such as talc, calcium carbonate, barium carbonate, and the like and extruded according to the method of this invention. Typically, filled polymers will have higher processing temperatures than unfilled polymers. But these filled compositions still may be extruded according to this invention with the barrel temperatures set appropriately higher.

This invention is illustrated, but not limited by, the following examples:

EXAMPLES 1–6

A series of extrusion runs was performed using a single screw 125-5 V Brabender extruder with five temperature zones. Elastomeric polypropylene polymers were obtained which had been prepared according to U.S. Pat. No. 5,324,080 having physical properties listed in Table II. Samples of these polymers were cryo-ground with dry ice in a Wiley mill, desiccant dried, stabilized (0.2 wt %. Ultranox® 2714A) and pelletized by melt processing through the Brabender extruder into strands which were chopped into pellets. All polymers from Examples 1–6 were able to be extruded and pelletized according to this invention. Results are presented in Table I.

TABLE I

| | Zone | | | | |
|---|---|---|---|---|---|
| | 1 | 2 | 3 | 4 | 5 |

Example 1

Set Temp. °C.[1]        160   100   90   90   90
Actual Temp. °C[2]      158   98    96   92   107[3]
Torque = 65–75 m·g;
Rotation = 77 rpm;
Pellet Yield = 4.3 Kg

Example 2

Set Temp. °C.[1]        160   100   90   90   90
Actual Temp. °C.[2]     162   111   97   94   112[3]
Torque = 61–80 m·g;
Rotation = 77 rpm;
Pellet Yield = 5.6 Kg

Example 3

Set Temp. °C.[1]        160   100   90   90   90
Actual Temp. °C.[2]     162   105   89   99   119[3]
Torque = 82 m·g;
Rotation = 80 rpm;
Pellet Yield = 4.9 Kg

Example 4

Set Temp. °C.[1]        160   100   90   90   90
Actual Temp.°C.[2]      156   101   92   104  126[3]
Torque = 70 m·g;
Rotation = 82 rpm;
Pellet Yield = 4.1 Kg

TABLE I-continued

| | Zone | | | | |
|---|---|---|---|---|---|
| | 1 | 2 | 3 | 4 | 5 |

Example 5

Set Temp. °C.[1]        155   85    75   75   75
Actual Temp. °C.[2]     156   85    79   82   100[3]
Torque = 63–71 m·g;
Rotation = 80 rpm;
Pellet Yield = 13.0 Kg Example 5 used a higher MFR polymer that required a lower final stage temperature for partial crystallization.

Example 6

Set Temp.°C.[1]         200   180   170  160   —
Actual Temp.°C.[2]      156   101   92   104   —
Torque = 61 m·g;
Rotation = 100 rpm;
Pellet Yield = 14.5 Kg The polymer composition in Example 6 was filled with 55 wt. % calcium carbonate, which required a higher final stage temperature.

[1]Barrel temperature machine setting.
[2]Actual barrel temperature measured by a thermocouple.
[3]Actual temperature measured by thermocouple inserted into flowing polymer exiting the die.

TABLE II

| Ex. | MFR[1] (g/10 min.) | $T_m$[2] °C. | $T_c$ °C. | m4[3] (%) | Mw | Mn | Mw/Mn | Density (g/ml) | Tensile Strength[4] (MPa) | Tensile Modulus[4] (MPa) | Elongation at Break[4] (%) |
|---|---|---|---|---|---|---|---|---|---|---|---|
| 1 | 15.5 | 147 30–165 | 88 | 43 | 221 | 55 | 4.0 | 0.8666 | 14.6 | 14.7 | 878 |
| 2 | 16.2 | 149 70–160 | 80 | 46.3 | 238 | 60.8 | 3.9 | 0.8692 | 16.9 | 17.6 | 792 |
| 3 | 8.1 | 150 58–170 | 78 | 44.6 | 252 | 71.8 | 3.5 | 0.8671 | 17.5 | 14.9 | 1170 |
| 4 | 1.5 | 151 58–170 | 64 | 35.3 | 370 | 134 | 2.8 | 0.8648 | 8.67 | 7.64 | 726 |
| 5[5] | 47.7 28 | 151 55–160 | 76 | 36.5 39.4 | 159 189 | 44.4 45.1 | 3.6 4.2 | 0.8668 | 6.74 | 8.51 | 1250 |
| 6 | 1.9 | [7] 70–165 | 88 | 25.9 | 318 | 111 | 3.0 | 0.8645 | 6.47 | 4.29 | 873 |
| 6A[6] | | | | | | | | | 6.54 | 8.23 | 1037 |

[1]ASTM D1238 Condition L
[2]$T_m$ = maximum peak in DSC; crystalline melting range = endotherm width observed in DSC
[3] $^{13}$C NMR
[4]ASTM D638 at 23° C.
[5]Data for MFR, m4, and molecular weight shown for each component of composite.
[6]6A shows properties of a 55 wt % calcium carbonate filed composition.
[7]No definitive endotherm peak maximum.

Run A and Example 7

Two runs of composite polymer samples of elastomeric polypropylene prepared according to U.S. Pat. No. 5,324,080 were processed through a Brabender single-screw extruder. The composite had an average melt flow rate (MFR) of 16 g/10 min. and m4 content of 34%. This composite had a melting range of 40–165 and a $T_m$ of 151 and a $T_c$ of 102 as measured by DSC. In Run A, the temperature profile of the extruder was set for conventional polymer with the exit temperature high enough to assure the exiting polymer was completely melted. In Example 7, the temperature profile was set such that the polymer composition in the last temperature zone contained crystallized polymer. Details of these experiments are shown in Table III below:

TABLE III

|  | Zone | | | | |
| --- | --- | --- | --- | --- | --- |
|  | 1 | 2 | 3 | 4 | 5 |
| Run A | | | | | |
| Set Temp. ° C.[1] | 160 | 155 | 155 | 155 | — |
| Actual Temp. ° C[2] | 159 | 153 | 156 | 154 | — |
| Torque = 12 m · g; | | | | | |
| Rotation = 100 rpm; | | | | | |
| Example 7 | | | | | |
| Set Temp. ° C.[1] | 100 | 100 | 100 | 100 | — |
| Actual Temp. ° C.[2] | 100 | 100 | 100 | 100 | — |
| Torque = 9 m · g; | | | | | |
| Rotation = 100 rpm; | | | | | |

[1]Barrel temperature machine setting.
[2]Actual barrel temperature measured by a thermocouple.
[3]Actual temperature measured by thermocouple inserted into flowing polymer exiting the die.

Strands of polymer exiting the die were directed to a water bath followed by a rotating blade pelletizer in each experiment. In Run A, the polymer did not pelletize well and the strand balled up between the pelletizer blades and stuck together. In Example 7, the strand was translucent out of the diehead and pelletized well. If an additive package were to be included in the composition used in Example 7, preferably, the initial extruder zones would be operated at above the polymer melting temperature to assure good additive dispersion.

What is claimed is:

1. A method to melt process a thermoplastic, partially-crystalline, olefin polymer in a multi-temperature stage extruder wherein the polymer has a broad melting temperature range comprising setting the temperature profile of the extruder such that a portion of the polymer crystallizes in the extruder and passing the resulting partially-crystallized polymer through an extruder die.

2. The method of claim 1 in which the thermoplastic polymer is a propylene polymer.

3. The method of claim 2 in which the propylene polymer contains up to 50 mole % ethylene units.

4. The method of claim 1 in which the initial stage temperature is set above the $T_m$ of the polymer.

5. The method of claim 1 in which the final stage temperature is set below the $T_c$ of the polymer.

6. The method of claim 1 in which the polymer crystallinity of the melt processed olefin polymer at room temperature is below about 30%.

7. The method of claim 1 in which the difference between $T_m$ and $T_c$ is greater than 50° C.

8. A method to melt process a thermoplastic, partially-crystalline, propylene polymer in a multi-temperature stage extruder wherein the polymer has a broad melting temperature range comprising setting the temperature profile of the extruder to permit full melting of the polymer in an initial stage of the extruder followed by a cooler stage in which a portion of the polymer crystallizes in the extruder and passing the resulting partially-crystallized polymer through an extruder die.

9. The method of claim 8 in which the propylene polymer is elastomeric.

10. The method of claim 8 in which the propylene polymer has a melting temperature range of 50 to 200° C.

11. The method of claim 8 in which the propylene polymer has a melting temperature range of 100 to 150° C.

12. The method of claim 8 in which the $T_c$ of the propylene polymer 30 to 90° C. lower than the $T_m$ of said polymer.

13. The method of claim 8 in which the m4 values of the propylene polymer are 25 to 45%.

14. The method of claim 8 in which an initial extruder temperature zone is 10 to 20° C. higher than the polymer $T_m$.

15. The method of claim 8 in which the final extruder temperature zone is 5 to 100° C. lower than the polymer $T_c$.

16. A method to melt process an elastomeric thermoplastic, partially-crystalline, propylene polymer in a multi-temperature stage extruder wherein the polymer has a melting temperature range of 50 to 150° C., a $T_m$ of about 75 to about 155° C. and a $T_c$ of about 45° C. to about 120° C. comprising setting the temperature profile of the extruder to permit full melting of the polymer in an initial stage of the extruder followed by a cooler stage in which a portion of the polymer crystallizes in the extruder and passing the resulting partially-crystallized polymer through an extruder die.

17. The method of claim 1 in which the extruder is a screw extruder.

18. The method of claim 1 in which the extruder is a static mixer.

19. The method of claim 1 in which the polymer contains an inert filler.

* * * * *

UNITED STATES PATENT AND TRADEMARK OFFICE
CERTIFICATE OF CORRECTION

PATENT NO. : 6,485,664 B1
DATED : November 26, 2002
INVENTOR(S) : Michael Wreschinsky It is certified that error appears in the above-identified patent and that said Letters Patent is hereby corrected as shown below:

<u>Title page, Item [54] and Column 1, lines 1 and 2,</u>
Reads "EXTRUSION CRYSTALLIZATION OF AN OLEFIN POLYMER" should read -- MELT PROCESSING OF AN ELASTOMERIC OLEFIN POLYMER --

<u>Column 1,</u>
Lines 9 and 10, reads "STATEMENT REGARDING FEDERALLY SPONSORED RESEARCH DEVELOPMENT" should read -- STATEMENT REGARDING FEDERALLY SPONSORED RESEARCH OR DEVELOPMENT --

Signed and Sealed this

Thirteenth Day of May, 2003

JAMES E. ROGAN
*Director of the United States Patent and Trademark Office*